May 1, 1934.  E. E. HEWITT  1,956,683
PIPE COUPLING
Filed Nov. 19, 1931
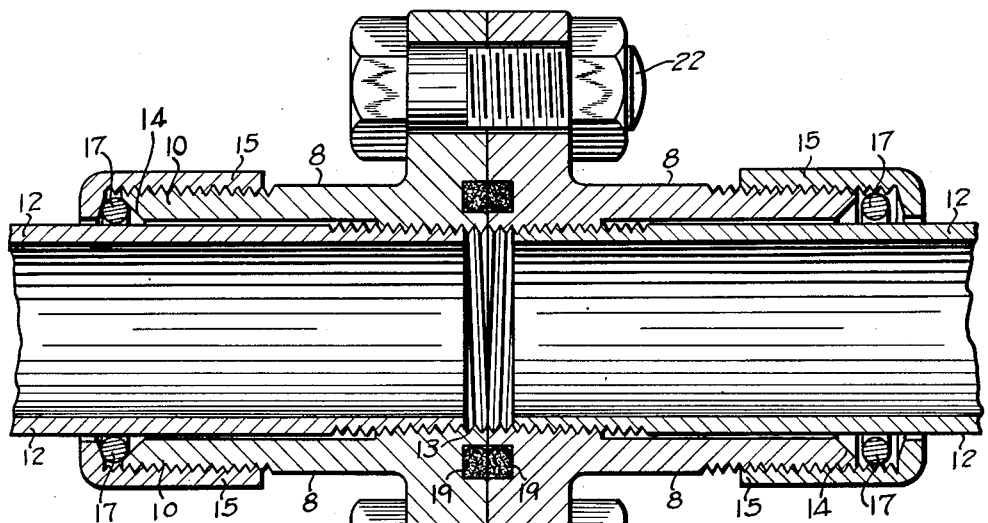
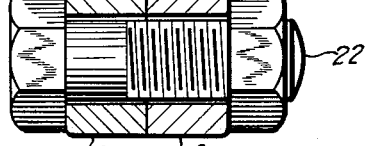
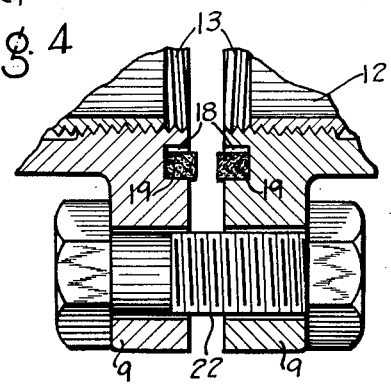
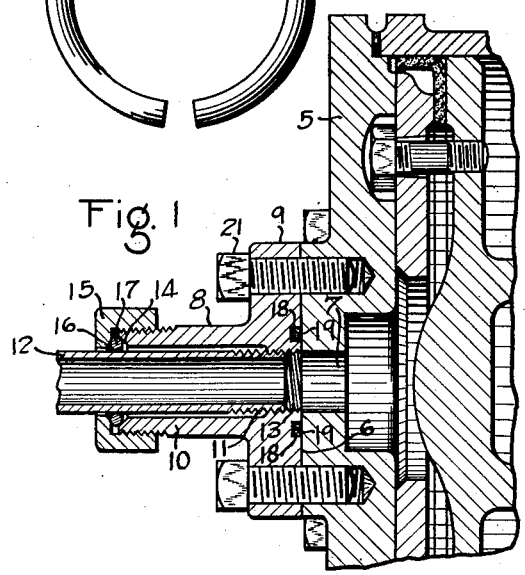
INVENTOR.
ELLIS E. HEWITT.
BY *Wm. M. Cady*
ATTORNEY.

Patented May 1, 1934

1,956,683

UNITED STATES PATENT OFFICE 1,956,683

PIPE COUPLING

Ellis E. Hewitt, Edgewood, Pa., assignor to The Westinghouse Air Brake Company, Wilmerding, Pa., a corporation of Pennsylvania Application November 19, 1931, Serial No. 575,985

7 Claims. (Cl. 285—137)

This invention relates to pipe couplings and particularly to pipe couplings or connections for securing a pipe section to a member with which it communicates or to another pipe section.

An object of my invention is to provide a pipe coupling wherein the pipe is supported at a point remote from the threaded end portion of the pipe section, and wherein a simplified form of seal is provided to render the joint between the pipe section and the member with which it communicates fluid tight.

A further object of my invention is to provide a pipe coupling of such simplified construction that the cost of manufacture is materially reduced.

These and other objects of the invention that will be made apparent throughout the further description thereof are attained by means of the pipe coupling hereinafter described and illustrated in the accompanying drawing, wherein:

Figure 1 is a longitudinal sectional view of a pipe coupling embodying features of my invention, shown associated with a fragment of a brake cylinder with which the pipe communicates.

Figure 2 is an elevational view of a metal clamping ring shown in Figure 1.

Figure 3 is a longitudinal sectional view of a pipe coupling for connecting two threaded pipe sections and embodying features of my invention.

Figure 4 is a fragmental section of the coupling shown in Figure 3 illustrating the condition of the packing before the coupling members are secured in cooperating relation.

Referring to Figure 1 of the drawing, the invention is shown as associated with a fluid brake cylinder head 5, having a flat coupling face 6 surrounding an opening 7 in the brake cylinder head. The coupling member 8 comprises a flange portion 9 and a sleeve portion 10 for receiving the threaded end 11 of a pipe section 12, the end of the pipe being threaded into a threaded opening 13 in the flanged portion of the coupling member.

The sleeve portion of the coupling member is provided with an annular seat that is tapered inwardly at a relatively sharp angle and is also threaded for receiving a threaded clamping nut 15 which is provided with an annular seat 16 that is tapered inwardly at a relatively slight angle and which engages a hard metal split ring 17 that is preferably made of hardened commercial round wire. The clamping ring is substantially the same diameter as the pipe 12 and rests against the seat 14. When the clamping nut 15 is screwed upon the sleeve, the clamping ring 17 is forced against the outer surface of the pipe 12 by reason of the tapered seats of the sleeve and nut and serves to support it at a point remote from the threaded end of the pipe section. By supporting the pipe 12 as described, substantially all lateral stresses are removed from the threaded portion of the pipe, thereby eliminating any danger of the pipe breaking at the threaded end thereof.

Clamping rings heretofore used in devices of this character were provided with a wedge surface for engaging the tapered seat in the coupling sleeve and such rings usually require machining operation to give them the proper size and form. By placing the ring between two inclined seats, a ring having a round cross section may be used effectively and consequently round hardened commercial wire may be used which requires no machining operation. The tapered seat 16 of the nut 15 being tapered at a slight angle tends to force the clamping ring into engagement with the pipe but does not cause such binding action on the nut as would preclude securely fastening the nut upon the sleeve.

The joint face of the flange portion 9 is provided with an annular recess or groove 18 into which a compressible packing ring 19 is inserted which has an external diameter substantially equal to that of the outer wall of the groove. The packing ring is of slightly greater thickness than the depth of the annular recess and consequently is compressed against the seat face 6 on the cylinder head as the flanged portion of the coupling is drawn into close connection thereto by means of the attaching bolts 21 that are threaded into the cylinder heads as indicated in Figure 1.

This form of coupling is of particular advantage because of its inexpensive construction and the ease with which the pipe may be connected to a member with which it communicates.

By reason of the fact that the flanged portion constitutes a smooth joint surface having an annular packing groove therein, two similar coupling members may be secured to one another to constitute a pipe union or coupling as shown in Figure 3. The coupling members being counterparts, are placed face to face as shown in Figure 3 and are clamped together by means of bolts 22. As shown in Figure 4, the packing rings 19 frictionally engage the outer surface of the packing grooves and are securely retained therein. The width of the packing rings is slightly greater than that of the packing groove and consequently when two coupling members are placed in cooperating relations, the packing rings are compressed into the groove and against one another and constitute a fluid tight seal.

The clamping nut 15 on the coupling member 8 at the right side of Figure 3 is shown backed away from its clamping position in order to show the position of the clamping ring just prior to being moved into clamping engagement with the tapered seat 14 and the wall of the pipe 12.

It will be apparent from the foregoing that the coupling members may be made of cast metal by simple machine operations and that the parts may be readily assembled.

While but two embodiments of the invention are shown, it is obvious that many changes, additions and omissions may be made in the coupling construction without departing from the spirit of the invention.

Having now described my invention, what I claim as new and desire to secure by Letters Patent, is:

1. The combination with a section of pipe having a screw-threaded end, of a member with which said pipe communicates having a plane joint face and an opening therein, a flanged member having a threaded opening for receiving and supporting the threaded end of the pipe, and having a plane joint face engaging the plane joint face of the first said member by metal to metal contact, the said joint faces of the flanged members each being provided with an annular packing groove surrounding the said threaded opening therein, yielding packing within each groove of greater thickness than the depth of the groove and of less width than that of the groove so that space is provided in the groove into which the packing flows when compressed and means for clamping the said joint faces in metal to metal contact with the packing of one member compressed into engagement with the packing of the other member.

2. A pipe union comprising a pair of cooperating interchangeable members having sleeve portions for receiving the threaded end of a pipe section, and cooperating flanged portions adapted to be secured together to provide a metal to metal joint, each flanged portion being provided with an annular packing groove containing a yielding packing of greater thickness than the depth of the groove and of less width than that of the groove so that space is provided in the groove into which the packing flows when compressed and adapted to register with and to be forced into compressing engagement with the packing of the adjacent flanged portion for constituting a fluid tight seal when said members are in cooperating joined relation.

3. A joint structure comprising a pair of cooperating members having portions provided with joint faces adapted to be secured together to provide a metal to metal joint, each face being provided with an annular packing groove containing a yielding packing of greater thickness than the depth of the groove and of less width than that of the groove so that space is provided in the groove into which the packing flows when compressed and adapted to register with and to be forced into compressing engagement with the packing of the adjacent face for constituting a fluid tight seal when said members are in cooperating joined relation.

4. A pipe supporting structure comprising a member having a face adapted for metal to metal engagement with a metal face, means for clamping the face of said member in metal to metal contact with said metal face, said member having a packing groove formed therein open to its face, and a yieldable packing in said groove and projecting outwardly beyond the face of the member and adapted to be engaged by said metal face, said packing being of less width than the width of said groove to provide space to accommodate the displacement of the packing when the face of the member is clamped in metal to metal contact with said metal face, said packing being entirely contained within said groove when said faces are in metal to metal contact.

5. A pipe supporting structure comprising two members having portions provided with faces adapted to be clamped together in metal to metal contact, means for clamping said faces in contact with each other, one of said members having a packing groove formed therein open to its clamping face, and a yieldable packing in said groove and projecting outwardly beyond the face of the member and adapted to be engaged by the face of the other member, said packing being of less width than the width of the groove to provide space to accommodate the displacement of the packing when the faces of the members are clamped together in metal to metal contact.

6. A pipe supporting structure comprising two members having portions provided with faces adapted to be clamped together in metal to metal contact, means for clamping said faces in contact with each other, each of said faces having an annular packing groove formed therein, and a yieldable packing in each groove adapted to register with the packing in the groove in the adjacent face, each packing being of greater thickness than the depth of the groove in which it is contained so as to insure a fluid-tight seal between said members when said faces are clamped together in metal to metal contact, and being of less width than the width of the groove to provide space to accommodate the displacement of the packing when the faces are being clamped together, said packings being entirely confined within the grooves when the clamping faces are in metal to metal contact.

7. A pipe supporting structure comprising two members having portions provided with faces adapted to be clamped together in metal to metal contact, means for clamping said faces in contact with each other, each of said faces having an annular packing groove formed therein, and a yieldable packing in each groove adapted to register with the packing in the groove in the adjacent face, each packing being of greater thickness than the depth of the groove in which it is contained so as to insure a fluid-tight seal between said members when said faces are clamped together in metal to metal contact, and being of less width than the width of the groove to provide for the displacement of the packing as the faces are being clamped together so as to insure of the packing being entirely confined within the grooves when the faces of the members are clamped together in metal to metal contact.

ELLIS E. HEWITT.